United States Patent
Huber et al.

(10) Patent No.: US 7,490,067 B1
(45) Date of Patent: Feb. 10, 2009

(54) METHOD FOR SELLING AND USING MEDIA OBJECTS AND A SUITABLE DEVICE FOR CARRYING OUT SAID METHOD

(75) Inventors: Adriano Huber, Locarno (CH); Claudio Cabano, Bern (CH)

(73) Assignee: Swisscom Mobile AG, Bern (CH)

( * ) Notice: Subject to any disclaimer, the term of this patent is extended or adjusted under 35 U.S.C. 154(b) by 667 days.

(21) Appl. No.: 09/926,686

(22) PCT Filed: Jun. 2, 1999

(86) PCT No.: PCT/CH99/00240

§ 371 (c)(1),
(2), (4) Date: Dec. 3, 2001

(87) PCT Pub. No.: WO00/76236

PCT Pub. Date: Dec. 14, 2000

(51) Int. Cl.
*G06Q 99/00* (2006.01)
(52) U.S. Cl. .............................. 705/51; 705/50; 726/26
(58) Field of Classification Search .................. 705/26, 705/50–79
See application file for complete search history.

(56) References Cited

U.S. PATENT DOCUMENTS 6,226,618 B1 * 5/2001 Downs et al. ................... 705/1
6,366,893 B2 * 4/2002 Hannula et al. ................ 705/40
6,661,777 B1 * 12/2003 Blanc et al. ................. 370/252

FOREIGN PATENT DOCUMENTS

EP  0 804 012  10/1997
WO  97 34410  9/1997

OTHER PUBLICATIONS

Wei Zhao & Satish K. Tripathi, Bandwidth-efficient continuous media streaming through optimal multiplexing, May 1999, ACM Press, pp. 13-22, ISSN:0163-5999.*

* cited by examiner

*Primary Examiner*—Andrew J. Fischer
*Assistant Examiner*—Jacob C Coppola
(74) *Attorney, Agent, or Firm*—Oblon, Spivak, McClelland, Maier & Neustadt, P.C.

(57) ABSTRACT

Method for selling and using digital media objects (6) as well as a mobile communications terminal (1) suitable therefor, in which method a media object (6) is ordered from a center (3) by a user by means of his mobile communications terminal (1), and is transmitted by the center (3) via a radio network (2) to the mobile communications terminal (1), where the transmitted media object (6) is stored in a memory (12) and where a media content (62) contained in the transmitted media object (6) is played back by a media playback module (13) of the said communications terminal (1) via a suitable medium. Preferably, prior to the transmission to a communications terminal (1), the media content (62) of the media object (6) is encrypted with a first key (7), assigned to this media object (6), this first key (7) is transmitted, encrypted by a public second key (9), to the communications terminal (1), and is decrypted there through a private third key (9'), and the encrypted media content (62') is decrypted by means of the decrypted first key (7") prior to playback through the media playback module (13).

22 Claims, 2 Drawing Sheets

METHOD FOR SELLING AND USING MEDIA OBJECTS AND A SUITABLE DEVICE FOR CARRYING OUT SAID METHOD

The present invention relates to a method for ordering and transmitting media objects and a device suitable therefor. In particular, the present invention relates to a method for ordering and transmitting digital media objects and a device suitable therefor.

In particular with the spread of the Internet, it has become more and more popular to offer digital media objects over the Internet, for example digital media objects with software, text, graphic, image, sound, video or combined multimedia content, to download them from the Internet, and store them temporarily in a personal computer in order to transmit them to a suitable, for instance a mobile, media playback device, for instance by means of data carriers such as compact discs, and to play them back by means of this media playback device, or to play them back by means of the personal computer if the personal computer is suitable therefor. In order to reduce the required transmission times and storage capacities for the digital media objects, the media objects are typically stored and transmitted in compressed form, and are decompressed before or during the playback. Standards for the storing, or respectively compressing/decompressing of digital media objects are available, such as, for example MPEG-3 (Moving Picture Expert Group), and it is expected that they will also be further developed in the future. Many users, who would be interested in playback of media objects, however, consider it too big a limitation that they are dependent upon a personal computer to obtain media objects from the Internet, and that for playback of the media objects by means of a handy, mobile media playback device they first have to transmit the media objects from a personal computer to this media playback device.

Described in the patent application EP 0 804 012 are a multimedia terminal and a method for multimedia reception by means of which multimedia data, for instance MPEG or DAB (Digital Audio Broadcasting) can be received, in particular over radio networks, and played back for a user. The multimedia terminal according to EP 0 804 012 comprises a bidirectional communications terminal, for example a mobile radio telephone, by means of which multimedia programs can be ordered over a communications network and can be loaded in the multimedia terminal. With the teaching according to EP 0 804 012, there is the risk that with too great a demand, the resources needed for the supply of ordered multimedia programs, for example the communications network and/or responsible servers, become overloaded and the users can no longer be served in a controlled way.

It is an object of this invention to propose a new and improved method for ordering and transmitting media objects and a device suitable therefor, which do not have the above-described drawbacks.

According to the present invention, this object is achieved in particular through the elements of the independent claims. Further advantageous embodiments follow moreover from the dependent claims and from the description.

A digital media object, for example with software, text, graphic, image, audio, video or combined media content, is transmitted by a center over a radio network, for example a radio network for mobile telephony, a DAB (Digital Audio Broadcasting) network, a satellite-based radio network or another radio network, to a mobile communications terminal where it is stored in a memory. A media playback module of this communications terminal plays back a media content, contained in the stored media object, via a suitable medium, for instance as sound waves by means of an electro-acoustical converter or as light waves by means of a display. The combination of a communications terminal, able to receive digital data from a center, with a media playback module has the advantage that mobile users are able to receive and play back media objects without being dependent thereby upon personal computers and without having to transmit themselves media objects between different devices.

A user orders at least one media object from at least one center by transmitting, by means of the communications terminal, an object order containing at least one object identification to the center via a mobile radio network, for example a GSM, UMTS or another mobile network, a media object assigned to the object identification being transmitted by the center to the communications terminal. This has the advantage that the user is able not only to play back the media objects stored on his communications terminal, but he is also able to obtain, in addition, media objects for playback spontaneously chosen by him and in a targeted way.

The above-mentioned aims are achieved through the present invention in particular in that object orders for digital media objects are received in the center, and data about which ordered media objects are available at which times, determined by the center, are transmitted to the respective communications terminal, and in that a respective communications terminal automatically contacts the center at one of the particular times and obtains from the center the media objects transmittable at this particular time. This has the advantage that the center is able to plan the full utilization of the resources required in the transmission of the media objects.

Before transmission to a communications terminal, the media content of a media object is preferably encrypted with a first key assigned to this media object, and is decrypted again by means of this first key before playback. It can thereby be ensured that unauthorized users are not able to play back the respective media object in an unauthorized way, the assignment of a separate first key to each media object making it possible to control the use of each media object and to make a key available to a user for each media object, for example in exchange for corresponding payment.

In an embodiment variant, media objects stored in a first communications terminal can be selected by the user of this first communications terminal and transmitted to a second communications terminal, the media content of this said media object remaining encrypted. This makes possible an indirect dissemination between users without unauthorized users being able thereby to play back the respective media object without the key assigned to this media object. The transmission from the first communications terminal to the second communications terminal takes place via a wired or via a wireless interface, for instance an infrared interface, e.g. a High Speed Infrared (HSIR) interface or an IrDA (Infrared Data Association) interface, an inductive interface, e.g. a Radio Frequency Identification (RFID) interface, a Home RF (Radio Frequency) interface, a Digital European Cordless Telecommunications (DECT) interface or another Cordless Telecommunications System (CTS) interface, or a high frequency radio interface, for instance a so-called "bluetooth interface."

A first key assigned to a said media object is preferably transmitted encrypted with a public second key to a communications terminal and decrypted there by means of a private third key, a pair of keys, consisting of the public second key and the private third key, being assigned in each case to a respective user of the communications terminal. The keys assigned in each case to a media object can thereby be transmitted in a protected way to an authorized user who has available the private third key which is associated with the public second key used for the encryption.

In an embodiment variant, data about conditions of use for a media object are also transmitted to a communications terminal, separately or together with a first key assigned to this media object. Rights of use and price information can thereby also be co-transmitted at the same time directly with the key, for example licensing fees and/or indications of price for one-time playback, multiple playback or time-limited playback of a respective media object, if applicable together with an indication of the limited time scope or a limited number of plays.

For the decryption of the media content of a media object, the decrypted first key assigned to this said media object is transmitted in a protected way, in an embodiment variant, to a decryption module of the communications terminal. That means that, depending upon the embodiment and integration of the decryption module in the communications terminal, measures are taken so that the decrypted first key cannot be read in an unauthorized way during the transfer to the decryption module.

Media objects preferably contain, in addition to the media content, unencrypted object information that can be obtained from the center via the mobile radio network by means of a said communications terminal, and can be listed on a display of the communications terminal, the user of the communications terminal choosing at least one media object for an object order by selecting corresponding object information from the list of displayed object information by means of the operating elements of the communications terminal. Unencrypted object data comprise, for instance, price indications concerning the media object, a designation of the media object, e.g. the title of a musical piece or of a video, the duration of play of the media object, a short sample playback of the media object, the performer or performers and/or writers of the media object and an object identification for the media object.

The object information for a media object preferably contains indications about the center where this media object can be obtained. These data can be used by the communications terminal to automatically contact the respective center, for example.

The object information for a media object preferably contains indications about a key server from which encrypted first keys can be obtained. This has the advantage that the keys can be automatically obtained by the communications terminal from the key server, which key server is implemented in the said center, for example, or separately.

In an embodiment variant, for payment for the playback of the media content of a media object, a monetary amount assigned to this media object is debited against a prepaid monetary amount stored on a chipcard of the communications terminal, e.g. an SIM (Subscriber Identification Module) card.

In an embodiment variant, the number of playbacks of the media contents of the media objects are counted in the communications terminal, and this determined number is transmitted to a license server, which is implemented in a said center, for example, or separately. This has the advantage that licensing fees depending upon the number of playbacks can be billed.

In an embodiment variant, the said private third key is stored on a chipcard of the communications terminal, which has the advantage that the private key can be removed from the communications terminal by the respective user.

Described in the following is an embodiment of the present invention with reference to an example. The example of the embodiment is illustrated by the following attached figures.

Figure 1:
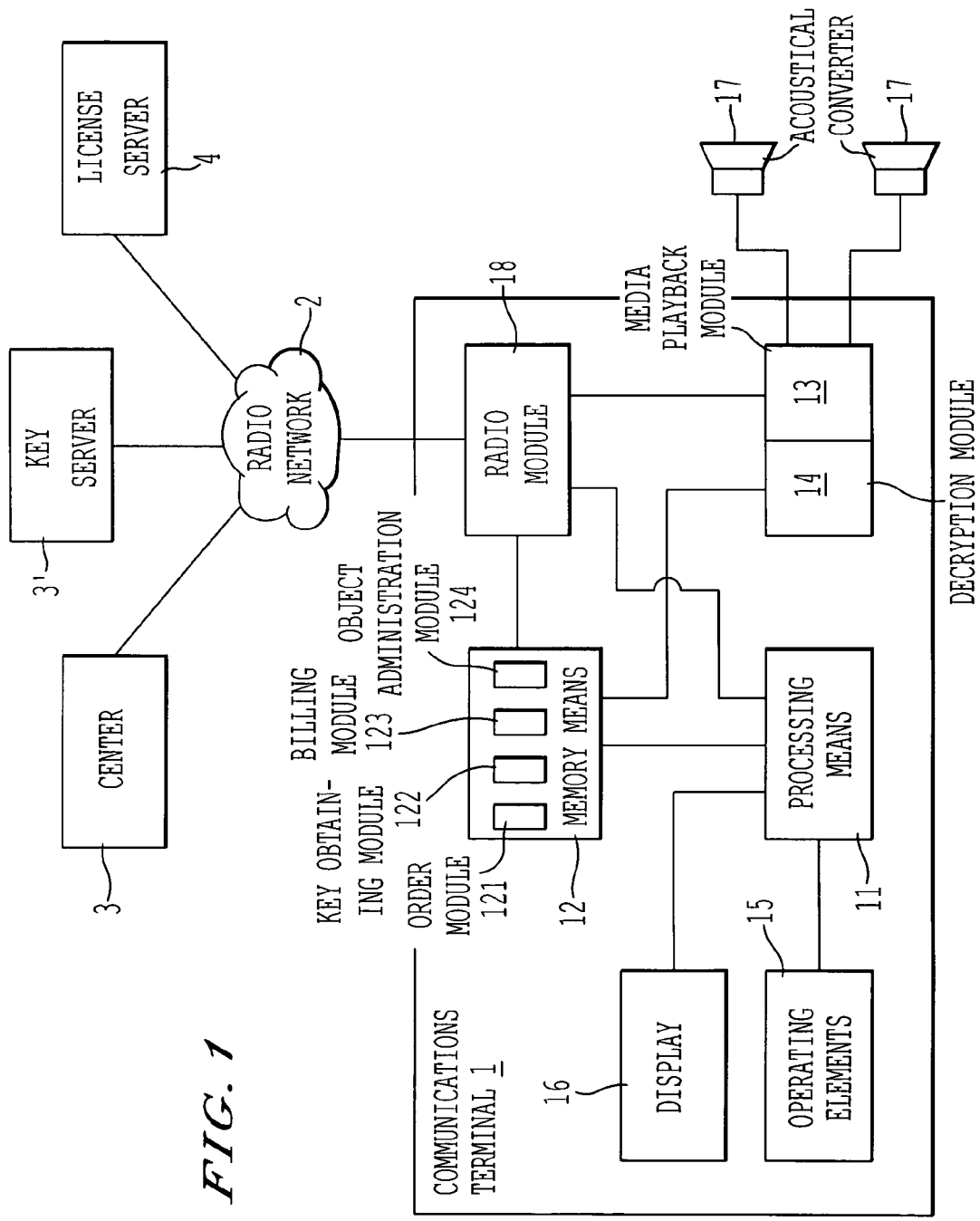
FIG. 1 shows a block diagram, which schematically illustrates a communications terminal with a media playback module, which communications terminal is connected to a center via a radio network.

The reference numeral 1 in FIG. 1 refers to a communications terminal. By means of a suitable radio module 18 via a radio network 2, comprising for instance a mobile radio network for the mobile telephony, e.g. a GSM, UMTS or other mobile radio network, a DAB (Digital Audio Broadcasting) radio network, a satellite-based radio network or another radio network, the communications terminal 1 is able to receive digital data, in particular digital media objects, for instance media objects with software, text, graphic, image, audio, video or combined media content, from a center 3, and is able to store them in a suitable memory 12 for digital data, for example in a RAM (Random Access Memory), on a hard disk, on a compact disc or on another data carrier able to be written on. The data carrier able to be written on can also be designed, for instance, in the form of a chipcard, e.g. an SIM card with extended memory area or a chipcard suitable for this purpose which can be removably connected, via a receiving point, with the communications terminal 1.

It should be mentioned here that the center 3 need not be directly connected to the radio network 2, but can just as well be connected to the radio network 2 via other devices (not shown). The center 3 is, for instance, a commercially available communications server having the necessary software and hardware components to transmit media objects directly or indirectly over the radio network 2 to communications terminals 1. For example, the center 3 comprises a DAB (Digital Audio Broadcasting) transmitter or has access to a DAB transmitter, or the center 3 comprises a short message service center (SMSC) or has access to a short message service center, through which program-accompanying digital data, or respectively short messages, e.g. SMS or USSD short messages, can be transmitted to the respective radio module 18 of the communications terminal 1. The center 3 can be set up in such a way that it is able to receive data from the radio module 18, for instance in short messages, e.g. SMS or USSD short messages, for instance via the mentioned short message service center. The center 3 can also be connected to the Internet, for example, which the communications terminal 1 is able to access via a mobile radio network, e.g. a GSM or UMTS network, via an Internet services provider. The key server 3' and the license server 4, which will be described later, can be implemented in the center 3 or separately, in a similar way as described for the center 3.

As illustrated in FIG. 1, the communications terminal 1 comprises processing means 11, which include at least one processor 11 connected to the radio module 18 and to the said memory 12, and is able to file data, for instance data received by the radio module 18, in this memory 12, or respectively access data stored in the memory 12, in particular digital media objects, and process these. The processor 11 is also able to access programmed software modules 121, 122, 123, 124, which will be described later, and execute these programmed software modules 121, 122, 123, 124.

The processor 11 is connected moreover to operating elements 15, for example a keyboard, and to a display 16, for example an LCD display (Liquid Crystal Display) in order to receive commands and data from the user, or respectively present visibly data, information, in particular also visual media contents of media objects, and instructions for the user.

Figure 2:
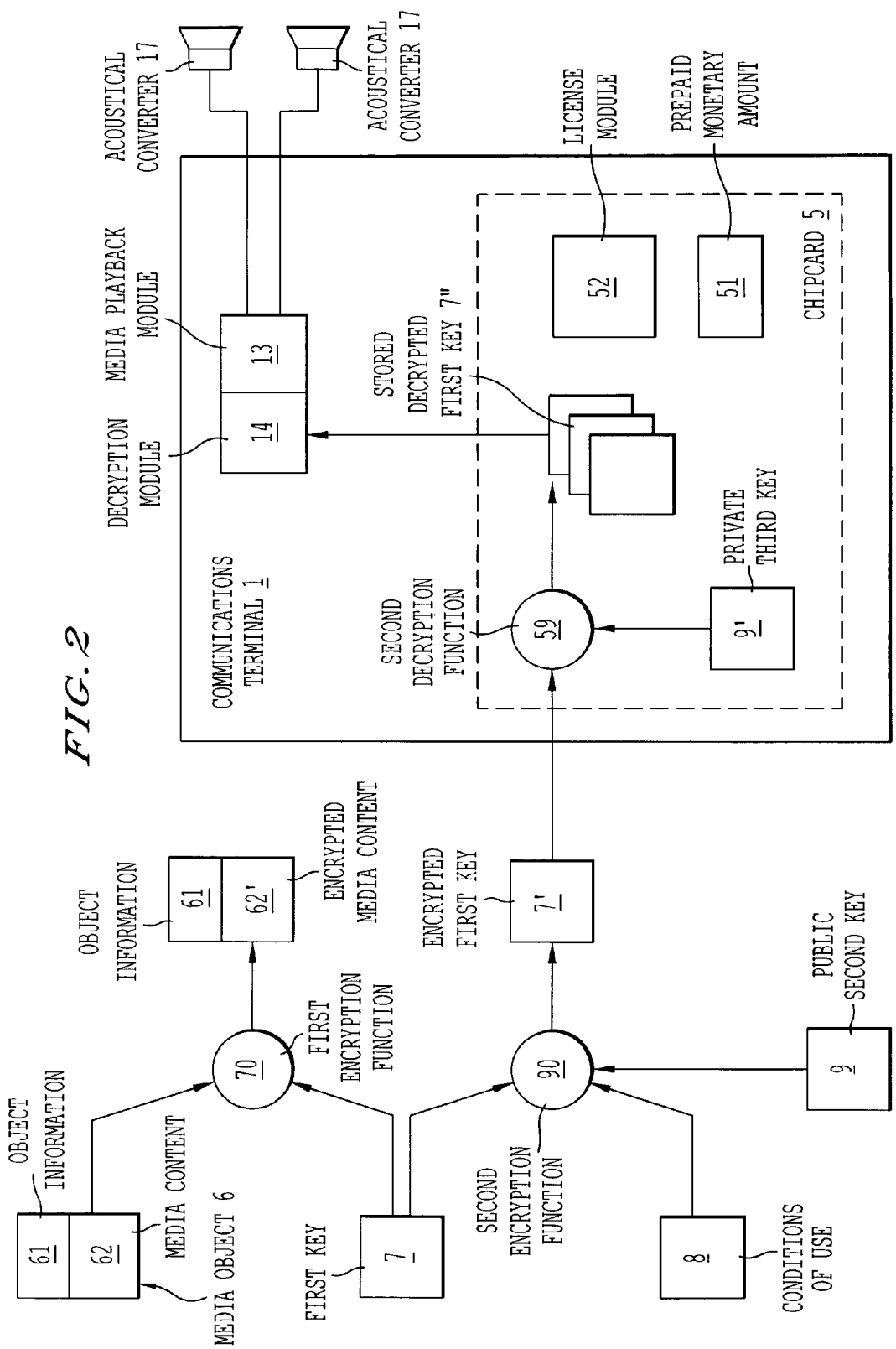
FIG. 2 shows a flow chart, which illustrates schematically the encryption and decryption of a media object with a first key, as well as the encryption of this first key with a public second key, and the decryption of this first key with a private third key.

As illustrated in FIG. 2, the media objects 6, as mentioned above, include a media content 62 and object information 61. The object information 61 contains data about the respective media object 6, for example price indications concerning the media object 6, a designation of the media object 6, for instance the title of a musical piece or a video, an object identification for the media object 6, the type of medium of the media object 6, the duration of play of the media object 6, or the performer or performers and/or writers of the media object 6. The object information 61 also contains in particular data about where the respective media object 6 can be obtained, for instance a call number, a network address or a URL (Universal Resource Locator) address of the respective center 3. The media content 62 of the media object 6 is preferably transmitted to the communications terminal 1 in compressed form, and stored there, for example in MPEG-3 (Moving Picture Expert Group) format or in another suitable format, and encrypted, preferably with a first key 7, assigned to the respective media object 6. The assignment of first keys 7 to the media objects 6 has the advantage that in this way the media content 62 of each media object 6 can be encrypted with an own key. The media objects 6 are stored, for example, in a database or in a file server of the center 3 with already compressed and encrypted media content, the first keys 7 assigned to the media objects being stored in a way accessible to the above-mentioned key server 3', and the key server 3' being implemented as programmed software module on a server of the center 3 or on as separate server. The above-mentioned object information 61 preferably contains moreover data about where first keys 7 for decryption of the respective media object 6 can be obtained, for instance a call number, a network address or a URL (Universal Resource Locator) address of the respective key server 3'.

As illustrated in FIG. 2, the media content 62 of a media object 6 is encrypted by means of a first key 7 assigned to the media object 6 and a first encryption function 70, which is implemented, for example, as a programmed software function in the center 3. The encrypted media content 62', as described above, is transmitted to the communications terminal 1. The first key 7 is transmitted in a protected way, for instance by means of a pair of keys assigned to the respective user consisting of a public second key 9 and a private third key 9'. The first key 7 is encrypted with the public second key 9, for example, through a second encryption function 90, for instance a programmed software function in the center 3 or in the key server 3'. The encrypted first key 7' is transmitted, for instance over the above-described radio network 2, to the communications terminal 1, where it is decrypted with the private third key 9' through a second decryption function 59. The encrypted first keys 7' or the decrypted first keys 7'' are stored in the communication terminal 1, for instance on a chipcard 5 of the communications terminal 1, on which chipcard 5 at least part of the memory 12 shown in FIG. 1 is located, or in the decryption module 14, which will be described later, in a way not readable from outside. If the decrypted first keys 7'' are stored in the communications terminal 1, in particular on the chipcard 5, the memory area necessary therefor should not be readable to a user. The chipcard 5 is, for example, an SIM (Subscriber Identity Module) card on which one (or more) private third key(s) 9' is (are) also stored, for instance. The storing of the encrypted first keys 7' or of the decrypted first keys 7'' and of the private third key 9' on a chipcard 5 has the advantage that, by removal of this chipcard 5 from the communications terminal 1, the encrypted media content 62' of the media objects 6 stored in the communications terminal 1 cannot be decrypted for unauthorized users and reproduced. The second decryption function 59 is, for example, a programmed software function, which is stored on the chipcard 5, for instance, and is executed by a processor 11, e.g. a processor on the chipcard 5. The second decryption function 59 can also be integrated in the decryption module 14, however. The public second key 9 is stored, for example, on the chipcard 5, for instance an SIM card, and is transmitted each time, upon request of the communications terminal 1, to the center 3 or to the key server 3'. The public second key 9 can also be read on the chipcard 5, upon initiative of the center 3, or respectively of the key server 3', or can be obtained from a TTP (Trusted Third Party) server, if applicable.

The decryption of the media contents 62' of media objects 6 is carried out in the decryption module 14, which decrypts the media contents 62', transmitted and stored in compressed form and encrypted, by means of a decrypted first key 7'' that is assigned to the respective media object 6, and passes on the decrypted media content to the media playback module 13. The media playback module 13 has the function of decompressing decrypted media objects and, depending upon the type of media, converting the digital data contained therein, if applicable, into analog signals, which analog signals can be applied, for instance, to electro-acoustical converters 17, e.g. loudspeaker or headphones. The decryption module 14 and the media playback module 13 can be implemented, for example, as programmed software modules on a signal processor suitable therefor, or as integrated circuits on separate or a common chip. It should be mentioned here that the electro-acoustical converters 17 are to be understood only as an application example, and that the media content 62 of a media object 6, depending upon its media type, can be played back in various ways via a suitable medium. Thus, for example, visual media objects, such as, for instance, text, graphics, images, videos, virtual reality sequences can be shown on the display 16 and played back by means of light waves, whereas combined multimedia objects, for instance, can be played back via a plurality of media, by means of light and sound waves.

Illustrated moreover in FIG. 2 is that, delivered in addition with the first key 7, can also be data about conditions of use 8 for the respective media object 6 to which the respective key 7 is assigned, which are transmitted, encrypted or unencrypted, together with the key 7 to the communications terminal 1. These data on conditions of use 8 can then be stored in the communications terminal 1 together with the respective encrypted first keys 7' or decrypted first keys 7''. The conditions of use 8 contain, for example, licensing fees and/or price indications for one-time and/or multiple but temporally limited playback of a respective media object 6, if applicable together with an indication about the limited time scope or a limited number of plays.

The order module 121, mentioned above and shown in FIG. 1, is a programmed software module which makes it possible for a user of the communications terminal 1 to obtain from the center 3 unencrypted object information 61 about media objects 6, to list this information on the display 16 and to browse through it by means of operating elements 15 of the communications terminal 1, to play back available unencrypted playback samples, if applicable, to select desired media objects by means of the operating elements 15, and to transmit corresponding object orders, containing at least one object identification, to the center 3. The order module 121 is implemented, for example, in the form of a browser, for instance as an Internet browser for direct access to the Internet or based on WAP (Wireless Application Protocol).

The received object orders are stored in the center 3, and ordered media objects 6 are transmitted to the respective communications terminal 1 by the center 3 at a time determined by the center 3. According to the present invention, object orders are received in the center 3, and data about which ordered media object 6 is available at which time, determined by the center 3, are transmitted to the respective communications terminal 1. The order module 121 of the respective communications terminal 1 receives the time, determined by the center 3, for transmission of the ordered media objects 6, stores it and automatically contacts the respective center 3 at the stored time, and obtains there the media objects 6 transmittable at the determined time. The time for the transmission is determined by the center 3 in such a way that resources used thereby, for instance the capacity of the radio network 2 or the database, or respectively of the file server of the center 3, are used as optimally as possible. With the delivery of a media object 6, the first key 7 assigned to this media object can also be transmitted at the same time, or this key can be transmitted separately, as will be described later. The transmission of the ordered media objects 6 can be implemented as a background process, ordered media objects 6 being conveyed through a separate data channel, for instance parallel to a telephone call. It should be mentioned here moreover that it can also be possible to a user to request the immediate transmission of ordered media objects 6, it being possible, for instance, to link this to a corresponding tariff model with higher fees.

As an alternative to the ordering of media objects 6 by means of the described order module 121, a user can also subscribe, for example, to media objects 6 by requesting from the operator of a center 3, for instance media objects 6 specified by him, e.g. the latest media objects 6 with media contents 62 of a particular artist, in a time-limited subscription or time-unlimited until revoked.

For the return channel to the center 3, the radio module 18 has a suitable transmitter and further components in order to communicate with the center 3 via the radio network 2—for example the radio module 18 has the functionality of a mobile radio telecommunications module, e.g. of communicating directly with the center 3 bi-directionally via a GSM or UMTS module over GSM or UMTS networks—or in order to access the center 3, connected to the Internet, via an Internet services provider.

The key obtaining module 122 is a further programmed software module, which makes it possible to obtain from the above-mentioned key server 3' an above-mentioned first key 7, which is assigned to a respective media object 6 and is necessary for the decryption of the media content 62' of this respective media object 6, the key obtaining module 122 being able to transmit the above-mentioned public second key 9 to the key server 3' for this purpose. The key module 123 can be used by the order module 122 <sic 121.> to obtain automatically for an ordered media object 6 the first key 7 assigned to this ordered media object 6, as well as the data on the conditions of use 8 for this media object, transmitted together with this encrypted key 7' or separately, whereby the data about the responsible key server 3', stored in the object information 61 of the respective media object 6, is used. The assignment of a first key 7 to the respective media object 6 can take place, for example, in that the key obtaining module 122 transmits the object identification received from the order module 121 to the key server 3', and assigns the first key 7', received from the key server 3' in the corresponding transaction, which key is decrypted as described above to this respective media object 6 during the storing in the communications terminal 1. In a further embodiment variant, together with the first key 7, for instance as a component of the key 7, the object identification for the media object 6, to which the key 7 is assigned in the center 3, can be transmitted to the communications terminal 1.

The object administration module 124 is a further programmed software module which can be started up by the user of the communications terminal 1, for example by means of the operating elements 15, in order to administer media objects 6 stored in the memory 12. The control of the object administration module 124 takes place by the user by means of the operating elements 15 of the communications terminal 1, for instance with reference to menu options that are displayed on the display 16 of the communications terminal 1. The object administration module 124 allows, for example, the listing and sorting of stored media objects 6 as well as the selection of listed media objects 6 for their playback or deletion. The object administration module 124 also comprises, for example, a programmed transmission function in order to transmit a selected media object 6, by means of the radio module 18, or by means of a wired or wireless interface (not shown), to a second communications terminal 1, the media content 62 of the media object 6 remaining encrypted in this transmission and a first key 7, assigned to this media object, having to be obtained by the second communications terminal 1, as described, from the key server 3'. The mentioned wireless interface is, for example, an infrared interface, for instance a High Speed Infrared (HSIR) interface or an IrDA (Infrared Data Association) interface, an inductive interface, e.g. a Radio Frequency Identification (RFID) interface, a Home RF (Radio Frequency) interface, a Digital European Cordless Telecommunications (DECT) interface, or another Cordless Telecommunications System (CTS) interface, or a high-frequency radio interface, for instance a so-called "bluetooth interface."

When a media object 6 is selected for playback, the media content 62' of the selected media object 6 as well as the encrypted first key 7' assigned to this media object 6, or the corresponding decrypted first key 7", is transmitted to the decryption module 14. It should be mentioned here that the storing and transmission of the decrypted first keys 7" to the decryption module 14 takes place in such a protected way that the keys 7" cannot be read and copied in an unauthorized way. For example, only the encrypted first keys 7' can be stored in the communications terminal 1, for instance on the chipcard 5, and decrypted in the second decryption function 59 in each case only just before transfer to the decryption module 14, as described above. The protected transfer of the decrypted first key 7" to the decryption module 14 takes place, for instance, through a further encryption or in that the second decryption function 59 is implemented directly in the decryption module 14 so that no decrypted keys 7" are readable outside the decryption module 14.

It should also be mentioned here that media objects 6, in a special mode that can be selected by the user, are not stored as object upon receipt in the communications terminal 1 but instead their media content 62' is conveyed via a buffer store to the decryption module 14 for playback (together with the encrypted first key 7' assigned to this media object 6 or with the corresponding decrypted first key 7"), this special stream mode being executable only if the transmission speed, or respectively transmission capacity, of the radio network 2 is sufficient therefor.

There are different variants for the billing of the procurement and playback of media objects 6, permitting prior or subsequent payment. For example, the above-mentioned chipcard 5 can contain a monetary amount value 51 paid in advance from which an amount is deducted upon procurement of each media object 6, or of each first key 7, and with the playback of a media object 6, or respectively with each use of a first key 7", which amount corresponds, for instance, to the price indications contained in the described object information 61 or conditions of use 8. This billing and debiting can be carried out, for example, through a billing module 123, a programmed software module. This billing module 123 can also be executed in such a way that amounts to be billed, for instance by means of the radio module 8, <are> passed on to a clearing unit (not shown) for further billing through written invoicing, e.g. as part of the telephone bill or through debiting a bank account.

For billing of the licensing fees for copyrights to the media objects 6, the playback of each media object is counted in the communications terminal 1, for instance through corresponding, programmed software functions in the license module 52, which module is stored e.g. on the chipcard 5 and in which the determined number of playbacks cannot be overwritten by the user. This counting takes place specifically for each media object 6, for instance with each use of a first key 7", communicated to the license module 52 by the decryption module 14, for instance. The determined number of playbacks is transmitted periodically, e.g. daily or upon reaching a predefined count of a counter, for instance by means of the radio module 18, to a license server 4, implemented in the center 3 or on a separate computer, for further processing.

The amounts to be billed can also be based on the actual playing time so that a user is debited only for the playback time actually used. To determine this actual playback time in a way that excludes fraud, a time reference is needed, which cannot be manipulated by the user of the communications terminal 1, and a protected memory area that cannot be overwritten by the user.

One skilled in the art will understand that there are various possibilities of organizing the storing of data, in particular media objects 6 and keys, and of programmed software functions and software modules in the communications terminal 1, i.e. of distributing them on different memory means 12, and of assigning programmed software functions and software modules for execution thereof to various processing means 11, i.e. various of several possible processors.

Besides billing for the procurement of keys and/or media objects as well as for the playback of these media objects, it can also be of interest to sell or lease communications terminals 1 according to the invention or to sell extension modules for conventional communications terminals, for instance mobile radio telephones or communication-capable laptop or palmtop computers, which extension modules, e.g. in the form of a chipcard, extend such conventional communications terminals 1 such that they are able to be used as a communications terminal 1 according to the invention. It can also be of interest to market data carriers with programmed software modules stored thereon, which software modules control a conventional communications server so as to be able to be used as described centers 3, key servers 3', and license is servers 4.

The invention claimed is:

1. A method for ordering and transmitting digital media objects, comprising:

transmitting an object order for digital media objects that comprises at least one object identification by a mobile communications terminal over a mobile radio network to a center, transmitting data on a time at which an ordered media object is available by the center to the communications terminal, wherein the time is determined by the center with regards to optimal usage of resources used for a transmission of ordered media objects and is stored in the communications terminal, automatically contacting, by the communications terminal, the center at the time, transmitting a media object assigned to the object identification by the center via a radio network to the communications terminal, where the media object is stored in a memory, and playing back, by a media playback module of the communications terminal, a media content included in the stored media object.

2. The method according to claim 1, wherein prior to transmission to the communications terminal, the media content of the media object is encrypted with a first key, assigned to said media object, and the media content is decrypted by said first key prior to playback through the media playback module.

3. The method according to claim 2, wherein media objects stored in a first said communications terminal are selected by the user of said first communications terminal and are transmitted to a second communications terminal, the media content of these media objects remaining encrypted.

4. The method according to claim 2, wherein the first key, assigned to the media object, is transmitted, encrypted by a public second key, to the respective communications terminal and is decrypted in the respective communications terminal by a private third key, the pair of keys, of the public second key and the private third key, being assigned to the user of the respective communications terminal.

5. The method according to claim 4, wherein data about conditions of use for the media object are also sent to the communications terminal separately or together with the first key assigned to said media object.

6. The method according to claim 4, wherein, for the decryption of the media content of the media object, the decrypted first key assigned to said media object is transmitted in a protected way to a decryption module of the communications terminal.

7. The method according to claim 1, wherein the media objects include in each case indications about the center where the respective media object can be obtained.

8. The method according to claim 2, wherein the media objects include in each case indications about a key server from which the encrypted first key can be obtained.

9. The method according to claim 8, wherein a key obtaining module of the respective communications terminal automatically requests, receives and stores the encrypted first key in each case from the key server.

10. The method according to claim 1, wherein the media objects include in each case indications concerning the media content of the media object, including at least one of price information, title indications, playing duration or a sample playback.

11. The method according to claim 1, wherein as payment for the playback of the media content of the media object a monetary amount assigned to said media object is debited against a prepaid monetary amount stored on a chipcard of the respective communications terminal.

12. The method according to claim 1, wherein the number of playbacks of said media content of the media object is counted in the respective communications terminal, and the number of playbacks is transmitted to a license server.

13. A mobile communications terminal configured to receive data disseminated over a radio network and configured to communicate over a mobile radio network, wherein said mobile communications terminal comprises:
- at least one processor;
- memory means connected to said at least one processor, wherein at least one of the memory means is configured to store digital media objects received over the radio network;
- a programmed order module configured to transmit an object order for digital media objects over the mobile radio network to a center, including at least one object identification; and
- a media playback module configured to play back a media content included in one of said digital media objects via a suitable medium,
- wherein the order module is configured to receive and store a time, determined by the center with regards to optimal usage of resources used for a transmission of ordered media objects and transmitted to the communications terminal, at which an ordered media object is available, and
- wherein the order module is further configured to contact the center at the time and store in the memory means a media object assigned to the object identification, which object is transmitted by the center via a radio network to the communications terminal.

14. The communications terminal according to claim 13, wherein the communications terminal further comprises a decryption module which is configured to decrypt the encrypted media content of the media object by a first key assigned to said media object.

15. The communications terminal according to claim 14, wherein the communications terminal further comprises a transmission function which is configured to transmit stored media objects to a second mobile communications terminal, the media content of said media objects remaining encrypted.

16. The communications terminal according to claim 14, wherein the communications terminal further comprises a key obtaining module, wherein said key obtaining module is configured to obtain a first key, assigned to the media object, from a key server via the mobile radio network, and the communications terminal comprises a second decryption function which is configured to decrypt, by a private third key, the received first key that is encrypted with a public second key, the pair of keys, of said public second key and the private third key, being assigned to the user of the communications terminal.

17. The communications terminal according to claim 16, wherein, the key obtaining module is configured such that, separately or together with the first key assigned to a said media object, the key obtaining module also obtains data about conditions of use for said media object.

18. The communications terminal according to claim 16, wherein said second decryption function is configured to pass on the decrypted first key in a protected way to the decryption module.

19. The communications terminal according to claim 16, wherein the key obtaining module is configured to automatically obtain from the key server the encrypted first key on the basis of indications about the key server, which indications are included in each case in the media object.

20. The communications terminal according to claim 13, wherein the communications terminal further comprises a billing module, wherein said billing module is configured such that, with the playback of the media content of the media object, the billing module debits a monetary amount assigned to said media object against a prepaid monetary amount stored on a chipcard of the communications terminal.

21. The communications terminal according to claim 13, wherein the communications terminal further comprises a license module, wherein said license module is configured to count the number of playbacks of the media content of the media object in the communications terminal, and transmits said number to a license server.

22. The communications terminal according to claim 13, wherein the memory means comprises at least one memory area on a chipcard, and said private third key is stored in the at least one memory area.

* * * * *